Dec. 24, 1968  R. B. GRAVER ETAL  3,418,081
REACTOR WITH FLUID LEVEL CONTROLLER
Original Filed Aug. 25, 1966
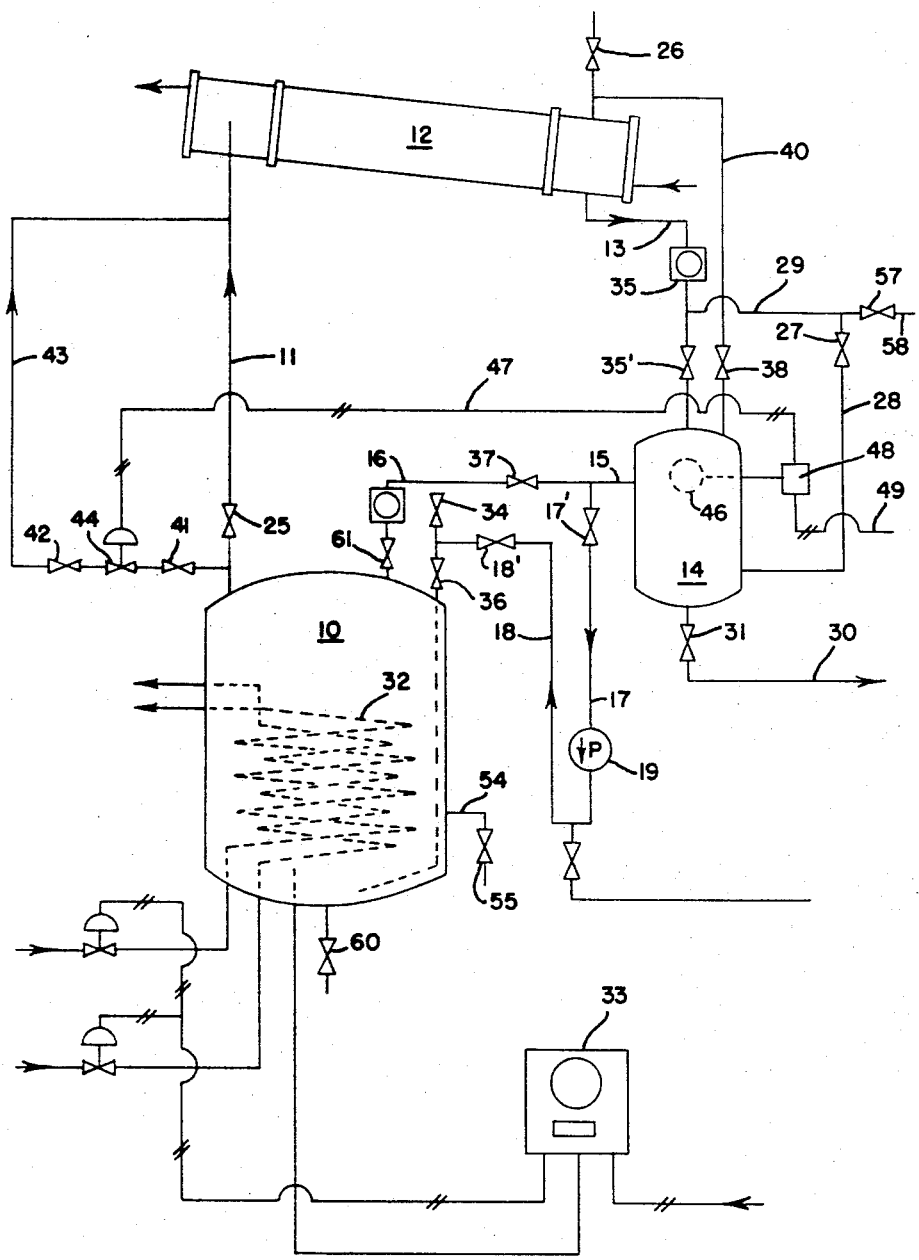
INVENTORS.
RICHARD B. GRAVER
NEWTON D. FAREL
BY
William J. Ewert
ATTORNEY

United States Patent Office 3,418,081
Patented Dec. 24, 1968

3,418,081
REACTOR WITH FLUID LEVEL CONTROLLER
Richard B. Graver, Savage, and Newton D. Farel, Minneapolis, Minn., assignors, by mesne assignments, to Ashland Oil and Refining Company, a corporation of Kentucky
Application Aug. 25, 1966, Ser. No. 575,049, now Patent No. 3,325,428, dated June 13, 1967, which is a continuation-in-part of application Ser. No. 1,249, Jan. 8, 1960. Divided and this application Apr. 14, 1967, Ser. No. 630,945
5 Claims. (Cl. 23—285)

ABSTRACT OF THE DISCLOSURE

Apparatus comprising, in combination, a closed reactor adapted to operate under atmospheric or elevated pressure, a condenser adapted to condense vapor withdrawn from said reactor, a tank adapted to receive condensate from said condenser and recycle the same to said reactor as reflux, and means to regulate and control the rate of said recycle in proportion to the rate of said withdrawal of vapor from said reactor when the same is operated under elevated pressure.

---

This is a divisional application of our copending application, Ser. No. 575,049, filed Aug. 25, 1966, which in turn is a continuation-in-part of our application, Ser. No. 1,249, filed Jan. 8, 1960, now abandoned.

In said copending application, there is disclosed a process for preparing non-gelled polyester resins or alkyds by solution esterification or polymerization of resin-forming components in solvent which is maintained at a relatively constant amount of 30–70 weight percent during the reaction when it is carried out under super-atmospheric pressure, e.g., internally generated pressure, and at elevated temperatures and with solvent reflux. The subject application is directed to apparatus which can be used in carrying out such a process and will be exemplified as applied thereto. However, this apparatus obviously can be used in carrying out other processes in which materials are reacted in a closed reactor at elevated pressure and temperature in a solvent or the like which is vaporized under the conditions of reaction, the solvent vapors are condensed, solvent condensate is recycled, and it is desired to maintain a substantially constant amount of solvent in said reactor.

Reference will now be made to the accompanying drawing, the single figure of which schematically illustrates a preferred embodiment of this invention, and this apparatus will be described as applied to the preparation of polyesters as disclosed in said copending application.

Referring to the drawing, reference number 10 refers to a reactor or autoclave, which can be provided with a suitable agitator (not shown), the reactor being connected through vapor conduit 11 to a condenser 12, the latter being provided with a condensate return conduit 13 to supply condensate to trap, tank, or receiver 14. Condensate from trap 14 can be returned to reactor 10 via return conduits 15 and 16, or via conduits 15, 17 and 18, the latter being provided with a circulating or metering pump 19. Reactor 10 can be provided with a suitable charging inlet (not shown) and a discharge outlet controlled by valve 60.

The conduit 11 is provided with a flow control and shut-off valve 25 for aid in vapor flow control and for closing conduit 11 when it is desirable to use the reactor 10 under the pressure of reaction. The condenser 12 is provided with an outlet having a vent valve 26 which permits operation of the condenser system at atmospheric pressure and permits the escape of non-condensable and harmful color inducing gases from the system.

The condensate return conduit 13 can be provided with a sight glass 35 and a flow control valve 35' for gravity feed of condensate from condenser 12 to trap 14. Conduit 13 can also be provided with by-pass conduits 28 and 29 having a flow control valve 27 therein. Conduit 29 can be connected to an outlet conduit 58, which is controlled by valve 57, and may be utilized for taking the condensate from the system. For example, if the amount of solvent used during processing is higher than desired in the final resin solution product, a portion of the solvent may be removed via conduit 58. The conduit 28 can be connected near the base of trap 14 so that in the event entrapped water is present in the condensate, the water will readily separate and settle out in the bottom of trap 14. Water collected in trap 14 can be readily drained therefrom by means of conduit 30 upon proper operation of control valve 31, and as is determined by a suitable sight glass (not shown). Conduits 15 and 16 provide for gravity return flow of the solvent condensate to reactor 10 upon opening valves 37 and 61, when reactor 10 is operated at atmospheric pressure. When reactor 10 is operated under elevated pressure, the solvent condensate can be returned to reactor 10 by way of conduits 15, 17 and 18 upon opening valves 17', 18' and 36 and by the operation of pressure pump 19. When pressure pump 19 is in operation, in order to return the condensate to the reactor against the pressure developed therein, valve 37 is closed. An auxiliary valve connection 34 can be provided as a means to add solvent to reactor 10, when desired.

Trap 14 is also provided with a pressure equalizing conduit 40 connecting the top of the trap with the top of condenser 12, where it is connected to the gas outlet vent controlled by valve 26, the equalizing conduit being adapted to be opened or closed by valve 38.

In order to correlate the control of the escape of solvent from reactor 10 with the return of solvent as condensate to the reactor, a by-pass conduit 43 is arranged about valve 25. By-pass conduit 43 is provided with auxiliary flow control valves 41 and 42 in combination with a pressure control valve 44 interposed therebetween. Pressure control valve 44 is regulated proportionately to solvent level in trap 14 by means of float 46 controlling the fluid pressure in conduit 47 through operation of a control valve or liquid level controller 48, which is connected to a source of fluid pressure (not shown) through conduit 49. Such a liquid level controller is commercially available, and it is not necessary here to describe its detail. Pump 19 and valve 44 can be adjusted so that the same amount of solvent is returned to the reactor as is removed through the valve.

Reactor 10 can be provided with a heating and cooling coil unit 32 in combination with a temperature controller 33; said coil unit and temperature controller are of conventional manufacture and do not require a description of their details for an understanding of their operation. Reactor 10 can be provided with an outlet 54, having a control valve 55 therein, in order to remove samples from the reactor for analysis, as hereinafter described.

The operation of the apparatus shown in the drawing will now be described as applied in the production of a non-gelled alkyd.

The following alkyd formulation was conventionally cooked under atmospheric reflux to an acid value of 40–50, the components of the formulation being in parts by weight:

| | Parts |
|---|---|
| Soya fatty acids | 725 |
| Glycerol | 332 |
| Pentaerythritol | 196 |
| Phthalic anhydride | 932 |

The resulting product was diluted with 4000 parts by weight of solvent (xylol) and the resulting solvent-diluted mixture was charged to reactor 10. (Said conventionally cooked product could have been initially prepared in reactor 10 and the solvent then added to it in the reactor.) After charging reactor 10 with the solvent-diluted mixture, trap 14 was filled with xylol solvent to the level of solvent condensate outlet conduit 15. Cooling water was passed through a suitable heating exchanger (not shown) in condenser 12. Then, all valves were closed except vapor flow control valve 25, vent valves 26 and 38, and flow control valve 27 in condensate by-pass conduit 28, 29. Heat was then applied through heating coil 32 by setting the temperature controller 33 to obtain the desired reaction condition of 450–480° F. The agitator (not shown) was started in the reaction chamber of reactor 10. When the temperature of reaction reached about 280° F., solvent started to distill over from the reaction mixture to condenser 12 via conduit 11, and air was displaced from the system through open valve 26. Distillation of solvent was observed by its collection in sight glass 35. Only a few moments of distillation will purge air and other non-condensable gases from the reactor 10. The open vent valve 38 provides for free flow of condensate through conduit 13 and conduits 28, 29 to trap 14, with valve 35' closed and valve 27 open.

After purging, the reactor 10 was sealed by closing valve 25. Heating of the reactor was continued until the desired reaction temperature of 450–480° F. was reached. At this temperature, the pressure in reactor 10 was about 110–125 p.s.i. Upon reaching the reaction temperature of about 460° F., valves 41 and 42 were opened, as were valves 17', 18' and 36, valves 26, 27 and 38 still remaining open. The solvent distilling off from reactor 10 filled trap 14 to a level above conduit 15 and flooded conduits 15 and 17. Due to the raised liquid level in trap 14, liquid level controller 48 was actuated by float 48 to introduce and control fluid pressure and operate pressure control valve 44. (In this manner, valve 44 was automatically adjusted during the reaction to function as a throttle valve and continuously bleed off from the reactor a mixture of solvent and water vapor and establish system equilibrium between the high pressure created by reaction and solvent and then reduced to normal pressure in the condenser and trap portions of the system.) Upon actuation of control valve 44 via liquid level controller 48, pump 19 was started to pump condensate from trap 14 and force it back into reactor 10 against the pressure created therein. Recycle of solvent in this fashion continues to maintain the solvent in the reactor at a relatively constant percentage level. Solvent in reactor 10 also serves as an azeotrope in carrying water to the trap 14. At suitable intervals, the water was drained from trap 14 by means of drain outlet 30.

As the reaction progressed, samples were periodically taken from reactor 10 and the acid values determined by conventional analysis. When the acid value fell below 3.5, on solution, pump 19 was stopped, valves 27 and 36 were closed, and valve 57 opened to allow the solvent distillate to drain off through conduit 58 into a suitable storage container (not shown). After about 2000 parts of xylol solvent had been distilled over, to obtain a product having a non-volatile solids content of 50% (on solution), valves 41 and 42 were closed and temperature controller 33 was set to provide for a flow of cooling fluid through heat exchange coil 32. After cooling, the non-gelled alkyd product was drained via valve 60 and filtered.

The above exemplifies the reflux conditions for maintaining a relatively constant percentage of solvent in the reactor within the range desired (30–70 weight percent) for converting an alkyd material of high acid number to a non-gelled low acid number having improved physical characteristics, as desired in said copending application. In making such product, it will be recognized that by suitable operation of the illustrated pressure azeotrope reflux system, changes in reaction temperature can be accomplished that will produce resultant changes in pressure and in the time of reaction. The solvent may be added after initial esterification, and the formation of the non-gelled resin then completed as described above, with or without removal of non-condensable gases from the system. For preparation of coating vehicles, it is desirable to remove non-condensable gases from the resins so as to provide lighter colors.

As mentioned earlier, the initially formed product could have been conventionally cooked in reactor 10. This was actually accomplished in another example by charging to reactor 10 the aforementioned initial formulation with about 5% by weight of solvent. All valves were closed except valves 25, 27, 37, 38, 26 and 61. The temperature control regulator 33 was set to heat the reactor to 350–380° F. The trap 14 was also initially filled with solvent in the manner heretofore described. The formulation was cooked under solvent reflux conditions to an acid number of about 40–50. Then, further solvent was charged to the reactor to bring the total solvent up to 65 weight percent of the mixture, the solvent being added with agitation of the mixture in the reactor. (Dependent upon the volatility of the solvent used, the preferred method is to initially cool the initial resin preparation to a temperature just below the boiling point of the solvent, by adjustment of the heat control and circulation of the cooling fluid through the heat exchanger of reactor 10, before adding the balance of the solvent. Such solvent may be introduced by a suitable auxiliary inlet to reactor 10 or by adding it through the auxiliary conduit controlled by valve 34.) After adding the balance of the solvent, the temperature controller 33 was adjusted to control the reactor temperature at about 450–480° F., and the reaction of the solvent-diluted mixture was carried to completion as described in the preceding example to produce a non-gelled alkyd.

In the two examples of the operation of the apparatus of this invention as described above, the alkyd was initially prepared and then converted to a low acid value, non-gelled product after addition of the solvent. In another aspect of this invention, the apparatus was used by first charging the same initial formulation to the reactor together with the total solvent (4000 parts by weight) and the entire reaction was completed in one stage using the pressure azeotrope system described to produce a non-gelled alkyd. While this mode of processing is not preferred, it will avoid the multiple or two-stage operation of the preferred process. This one stage process requires about twice the reaction time even when run at higher temperatures. This time element, among other factors, makes this mode of procedure more costly and less desirable for practical plant operations.

The system described above provides for super-atmospheric pressure only in the reactor and atmospheric or low pressure in the condenser and trap with close control of the reflux rate and return of solvent to the reactor. Thus, the danger of use of inflammable coating solvents under pressure in the condenser portion of the system is avoided. The return of the solvent to the reactor can be controlled at a fairly constant rate in order to maintain the desired amount of solvent at all times in the reaction system during the reaction process.

As described in said copending application, in order to provide a non-gelled alkyd product with desirable properties, including a low acid value, the alkyd-forming reaction is carried out in the presence of 30–70% solvent, based on the total charge including solvent, with about 40–65% solvent being preferred for a high level of efficiency. The solvents used must be inert with respect to the reaction constituents and resin product under condition of reaction and should have boiling ranges up to about 400° F., and must have low solubility for water to facilitate removal of water of reaction. Further description of solvents and the reaction conditions, as well as the various resins which can be formed, will be omitted here in the interest of brevity, and the disclosure of said copending application is incorporated herein in its entirety by reference.

Various modifications and alterations of this invention will become apparent to those skilled in the art, and this invention should not be limited unduly to that described herein for illustrative purposes.

We claim:
1. Apparatus comprising in combination:
   an enclosed reaction vessel;
   means to heat said vessel and vaporize a liquid therein;
   a condenser;
   first conduit means connected to said reaction vessel and said condenser to permit the flow of vapor from said vessel to said condenser;
   a receiving vessel;
   second conduit means connected to said condenser and said receiving vessel to permit the flow of condensed vapor from said condenser to said receiving vessel;
   third conduit means connected to said receiving vessel and said reaction vessel to permit the flow of said condensed vapor to said reaction vessel;
   valve control means connected to said first conduit means to control rate of flow of said vapor therein; and
   control means connected to said receiving vessel and said valve control means, said control means adapted to sense changes in the amount of said condensed vapor in said receiving vessel from that of a predetermined value and accordingly adjust said valve control means, and thereby maintain the amount of said liquid in said reaction vessel within a predetermined range.

2. The apparatus according to claim 1, further comprising:
   pumping means connected to said third conduit means and adapted to pump said condensed vapor therein to said reaction vessel against pressure developed therein.

3. The apparatus according to claim 1, wherein said valve control means comprises a throttle valve, and said control means comprises a liquid level controller adapted to sense changes in the level of said condensed vapor in said receiving vessel from that of a predetermined minimum level and accordingly control said throttle valve to throttle said flow of said vapor in said first conduit means.

4. The apparatus according to claim 1, further comprising:
   fourth conduit means connecting said reaction vessel to said condenser;
   fifth conduit means connecting said receiving vessel to said reaction vessel;
   valve means in each of said second, third, fourth and fifth conduit means, said valve means in said first and third conduit means adapted to be opened and said valve means in said fourth and fifth conduit means adapted to be closed when said reaction vessel is operated under super-atmospheric pressure, and said opened and closed conditions of said valve means adapted to be reversed when said reaction vessel is operated at atmospheric pressure.

5. Apparatus comprising in combination:
   an enclosed reaction vessel adapted to operate under atmospheric or super-atmospheric pressure;
   heat exchange means to heat said reaction vessel and vaporize a liquid therein;
   a condenser adapted to operate under atmospheric pressure and disposed at an elevation above said reaction vessel;
   first and second conduit means both connecting the top of said reaction vessel to said condenser to permit the flow of said vapor from said reaction vessel to said condenser;
   a receiving vessel adapted to operate under atmospheric pressure and disposed at an elevation below said condenser and above said reaction vessel;
   third conduit means connecting said condenser to said receiving vessel to permit gravity flow of condensed vapor from said condenser to said receiving vessel;
   fourth conduit means connected to receiving vessel, at a predetermined elevation, and to said reaction vessel to permit the gravity flow of condensed vapor from said receiving vessel to said reaction vessel;
   fifth conduit means connected to said receiving vessel, at said predetermined elevation, and to said reaction vessel;
   pumping means connected to said fifth conduit means to pump condensed vapor from said receiving vessel to said reaction vessel against the pressure developed therein;
   throttle valve means connected to said first conduit means;
   liquid level control means connected to said receiving vessel and said throttle valve means, said liquid level control means adapted to sense changes in the level of said condensed vapor therein from said predetermined elevation and accordingly adjust said throttle valve means when said reaction vessel is operated under super-atmospheric pressure and thereby, together with said pumping means, maintain the amount of said liquid in said reaction vessel within a predetermined range; and
   valve means in each of said first, second, fourth and fifth conduit means, said valve means in said first and fifth conduit means adapted to be opened and said valve means in said second and fourth conduit means adapted to be closed when said reaction vessel is operated under super-atmospheric pressure, and these said conditions of said valve means adapted to be reversed when said reaction vessel is operated under atmospheric pressure.

References Cited
UNITED STATES PATENTS 3,325,428   6/1967   Graver et al. _____ 260—22

JAMES H. TAYMAN, JR., *Primary Examiner.*

U.S. Cl. X.R.

23—263, 253, 1; 202—160; 203—2, 1; 137—7, 88